United States Patent [19]

Sodich

[11] 4,252,210
[45] Feb. 24, 1981

[54] METHODS OF AND APPARATUS FOR GENERATING SEISMIC WAVES

[76] Inventor: Ernest O. Sodich, P.O. Box 647, Caldwell, Tex. 77836

[21] Appl. No.: 954,508

[22] Filed: Oct. 25, 1978

Related U.S. Application Data

[63] Continuation-in-part of Ser. No. 794,491, May 6, 1977, abandoned.

[51] Int. Cl.³ .................... G01V 1/14; G01V 1/40
[52] U.S. Cl. ........................... 181/119; 181/120; 181/401; 367/142; 175/1
[58] Field of Search ............... 181/106, 119, 120, 401; 175/1, 296; 340/7 R; 73/644; 166/249; 367/142

[56] References Cited

U.S. PATENT DOCUMENTS

| | | | |
|---|---|---|---|
| 2,281,751 | 5/1942 | Cloud | 181/106 |
| 2,424,108 | 7/1947 | Merten | 166/249 |
| 3,221,833 | 12/1965 | Malmberg | 181/119 |
| 3,282,371 | 11/1966 | Miller | 175/1 |
| 3,346,066 | 10/1967 | Miller et al. | 181/106 |
| 3,718,205 | 2/1973 | Fair et al. | 181/106 |
| 4,042,063 | 8/1977 | Waters | 181/119 |

FOREIGN PATENT DOCUMENTS

| | | | |
|---|---|---|---|
| 1117983 | 5/1956 | France | 181/120 |
| 1234756 | 10/1960 | France | 181/120 |
| 2376422 | 9/1978 | France | 181/119 |

Primary Examiner—Nelson Moskowitz
Attorney, Agent, or Firm—Fulbright & Jaworski

[57] ABSTRACT

In generating seismic waves in earth a generator having a generally elongate, tubular expandable and contractible outer wall portion closed at its upper and lower ends by rigid strength members having separate input and return pressure lines is placed in a well bore, a hydraulic coupling pressure is applied through the input line which causes the expandable wall portion to engage and remain coupled with and in direct contact with the earth wall in the well bore and hydraulic pressure impulses are then cycled through the input and return lines at pressures greater than the coupling pressure to cause further expansion of the expandable wall portion, thereby generating and radiating seismic waves in the earth upon application of each impulse while maintaining the hydraulic coupling pressure sufficient to effectively maintain the outer wall anchored to the wall of the bore hole. The coupling pressure should be sufficient to anchor and couple the transducer to the well bore without any additional anchoring. The pressure impulses should be sufficiently higher than the coupling pressure to create motion in the earth within the earth's elastic range. In marsh or marine waters, the coupling pressure is omitted and the generator is placed in the water above the earth.

8 Claims, 7 Drawing Figures

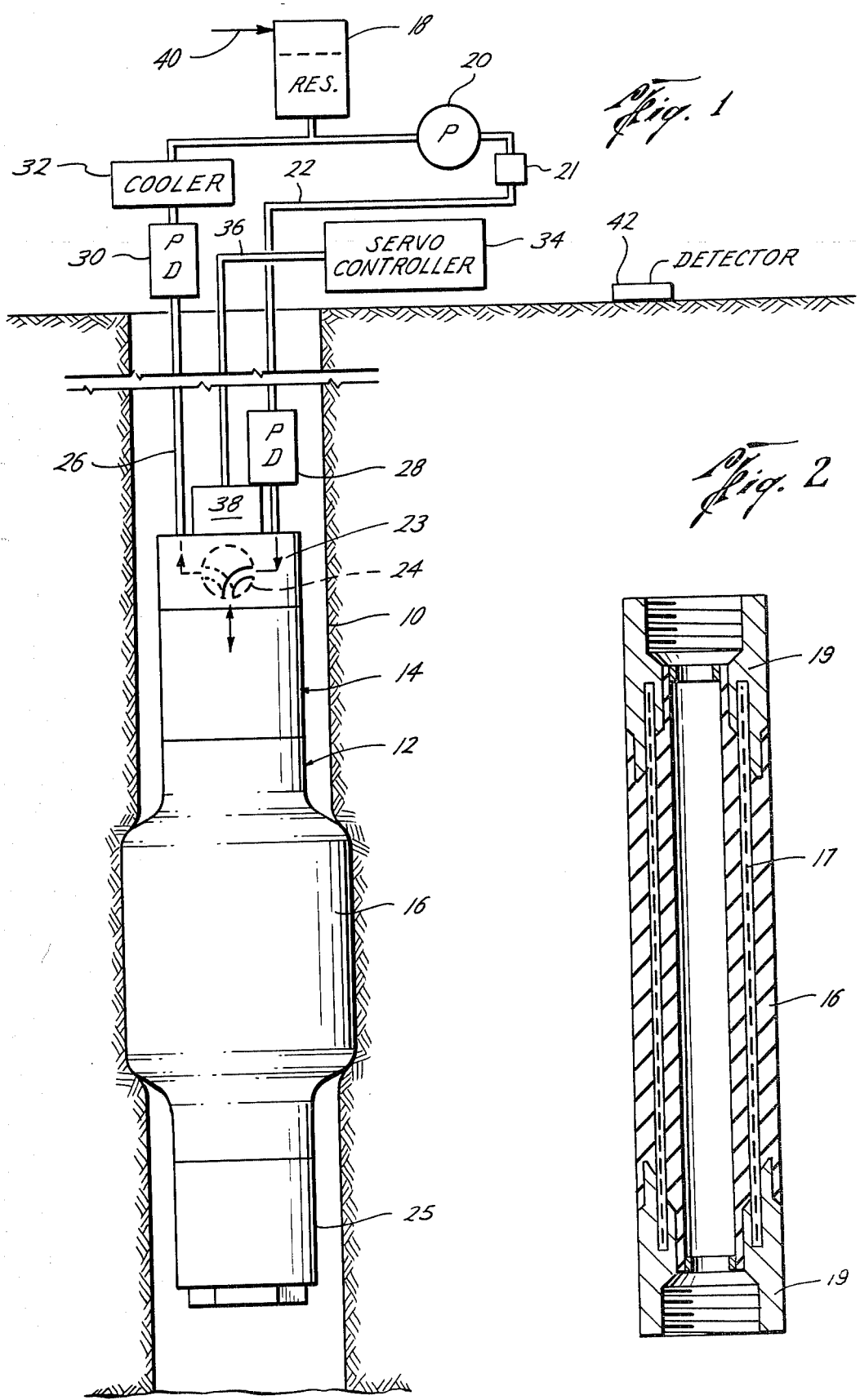

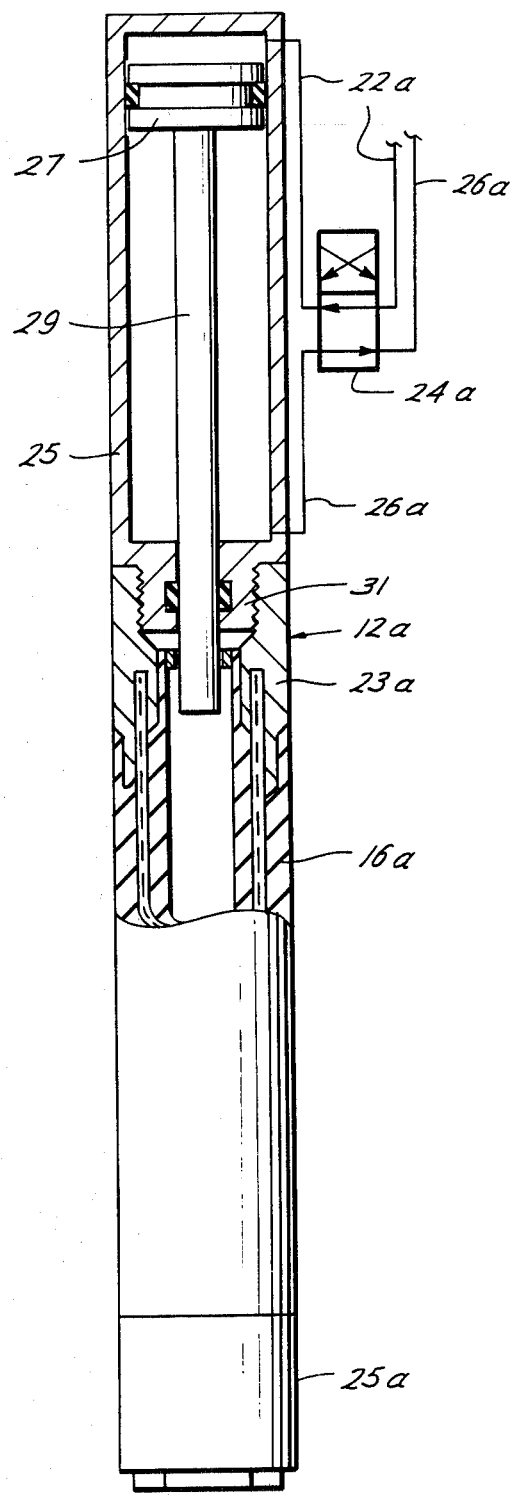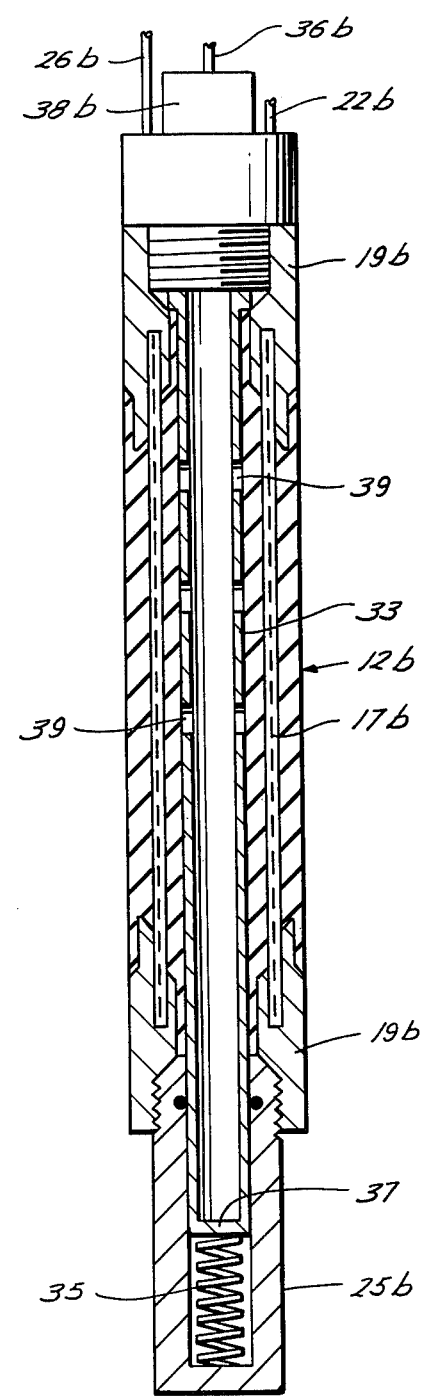

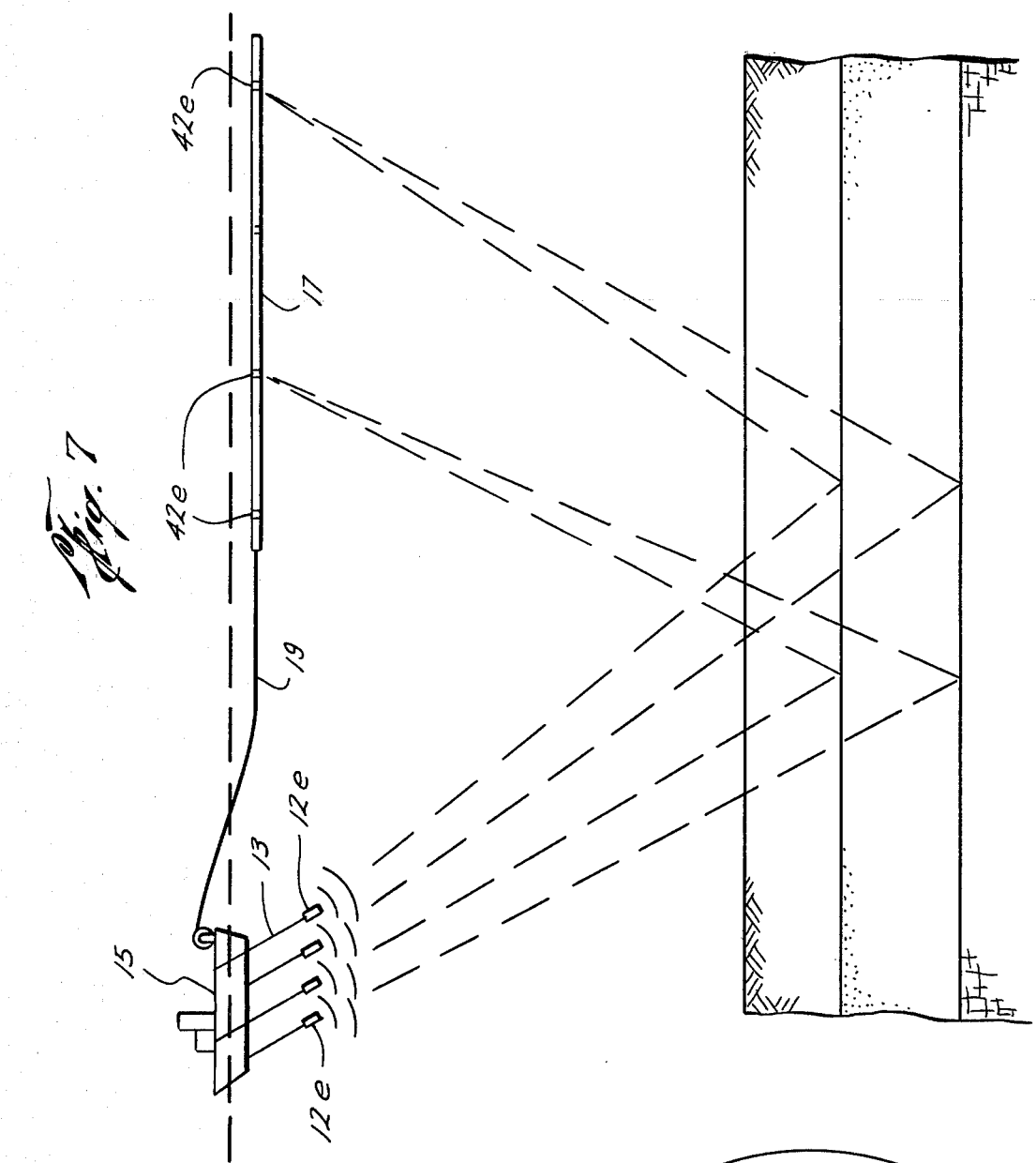

METHODS OF AND APPARATUS FOR GENERATING SEISMIC WAVES

CROSS REFERENCE TO RELATED APPLICATION

This application is a continuation-in-part of application Ser. No. 794,491 filed May 6, 1977, abandoned in favor of this application.

BACKGROUND OF THE INVENTION

Geophysical prospecting is employed to determine the subsurface structure of the earth, and in one form seismic waves are generated in the earth so as to be reflected by the subsurface layers. These reflected waves are detected and recorded, and, when properly interpreted, provide certain indications concerning the possible location of natural resource deposits, such as mineral deposits, petroleum deposits and the like. The generated seismic waves are introduced into the earth by the application of forces of considerable magnitude, such forces being produced either by detonations of explosives, through the movement of very large weight masses, or by acoustic energy.

The production of seismic waves by the detonation of explosives has many inherent disadvantages. The explosion frequently renders the surrounding portion of the earth unsuitable for similar subsequent wave generation at the same location, there is little or no control over the frequencies of sound waves generated by explosives, the consequent reflections are of such varied frequencies that the results cannot easily be interpreted, large surface waves which disturb the recording equipment are produced, and a relatively small amount of the energy from the detonation is utilized to produce the seismic waves.

In systems in which seismic waves are generated by the movement of large masses, generally referred to as land vibroseis exploration, the energy source consists of three major components: (1) the generator, or vibrator assembly, (2) an electrohydraulic power supply and its controls, and (3) the vehicle or prime mover. A typical crew would consist of four such sources along with a recorder-geophone system and other support equipment. The base plate of the generator against the earth's surface must remain firmly coupled to the surface throughout the cycle to transmit undistorted energy to the earth, thus requiring an excess of vehicle weight to the base plate to provided sufficient coupling force to the ground. Thus, the force output is limited by vehicle weight. In addition, considerable noise is generated at the surface which interferes with the detection and recording of the seismic waves. There is great difficulty in transporting the necessary equipment between various location and the number of areas in which it can be used are thus limited and such sources are only usable on the surface of the earth and cannot be utilized below the surface.

Among publications known to me disclosing and suggesting various means and methods of producing a seismic wave are the following U.S. Pat. Nos. 2,281,751; 3,221,833; 3,282,371; 3,292,143; 3,346,066; 3,641,811; 3,718,205; 3,831,138; 3,876,917; 3,900,826; and 4,402,063. Additional such publications known to me include Seismic Energy Sources, 1968 Handbook, published by United Geophysical Corporation, and presented at the 38th Annual Meeting of the S.E.G. of Denver, Colo., October, 1968; Marine Vibroseis System, published by the Seismic Engineering Company, 1133 Empire Central, Dallas, Tex. 75247; Seismic Energy Generators, Vehicles Which Generate Seismic Waves by Movement of Large Masses, known to be available to the trade from Dresser Industries, Inc., Houston, Tex.; Geo Space, Houston, Tex.; Mertz Iron and Machine Works, Inc., Ponca City, Okla.; Failing, Inc., Enid, Okla.; Industrial Vehicles, Inc., of Tulsa, Okla.; Seismic Engineering Company, 1333 Empire Central, Dallas, Tex.; and the Belmont Dinoseis from Belmont Manufacturing Co., Broken Arrow, Okla.

U.S. Pat. No. to Cloud, 2,281,751, dislcoses filling a flexible bag with water which is lowered to the bottom of the bore hole and a separate anchoring mechanism is inserted to hold the bag down. Unless the bag is perfectly constrained by the hole walls and bottom and the anchor, the bag extrudes into some crack and breaks. Also, pressure is directed to the bottom and top of the well bore rather than only to the walls of the well bore.

U.S. Pat. No. to Malmberg, 3,221,833 utilizes a piston and cylinder arrangement and shoes to engage the walls of the well bore which may become cocked due to hole irregularities causing binding of the pistons and malfunctioning and sticking of the tool in the well bore.

U.S. Pat. No. to Miller 3,282,371, discloses an expander similar to the Malmberg construction as an anchor only. A second anchor is provided on the earth's surface and hydraulic pressure is applied to move the anchors to and away from one another.

U.S. Pat. No. to Baker 3,376,949 discloses a single pulse device, the frequency of which is determined by adjusting the size and perforations and the character of a resilient outer tube, which frequency cannot be varied during operation.

U.S. Pat. No. to Mertin 2,424,108, is similar to the device of Baker with the same problems. Mertin's land apparatus is not programmable and appears to depend upon the physical characteristics of a resilient ball to provide frequency of modulation.

U.S. Pat. No. 3,718,205 to Fair discloses a transducer utilizing the to and fro operation of a piston which is transmitted mechanically through a shaft to other pistons to displace hydraulic fluid and pressure to a metal bellows.

U.S. Pat. No. 4,042,063 to Waters illustrates a shear wave vibrator in which a shear wave is generated with an air cushion principle.

Other of the foregoing seismic energy sources illustrates the state of the art; however, none of them discloses or suggests a method of and apparatus for generating a seismic wave which includes a tubular expandable outer wall closed at each end by rigid, high-strength closure members to which two different pressures are applied, one for anchoring the generator to the wall and the second of greater intensity to provide the radiated waves which are directed only to the walls of the well bores.

It would be highly desirable to provide apparatus and methods of generating seismic energy, which are not affected by non-similarities, in which weathering effect is reduced, which are programmable, permitting precise control of wave form and synchronization of multiple units, in which no hold-down is required when used in a well bore but is coupled and anchored to the earth wall, which is efficient in that its output can be tuned to not crush or fracture the earth as with dynamite but produces seismic energy within the elastic range of the earth and a large portion of its energy is not wasted, such as in conventional vibroseis and dynamite, which is flexible in that its force output can be increased readily and easily, which is economical with respect to initial capital costs, maintenance, transportation and operation, which is portable and lightweight, transportable by helicopters or mounted on much smaller vehicles than conventional land vibroseis, which permits multiple sweeps from the same position in a bore hole, and which can be operated as a single pulse source thereby having the advantages of dynamite explosions without the disadvantages of dynamite, such as hole damage.

It would also be desirable to provide such apparatus and methods of generating seismic waves which can be used for a variety of purposes, for example, on land or in sea, for geophysical prospecting, civil uses and the like, and which can be readily adjusted to fit circumstances of use.

SUMMARY

The present invention is directed to methods and apparatus for generating seismic waves which overcome the problems of prior such methods and apparatus and which have the advantages mentioned in the preceding paragraph.

It is therefore an object of the invention to provide efficient, relatively inexpensive and portable methods of and apparatus for generating and radiating seismic waves in earth and in earth under marsh and marine waters.

A further object of the present invention is the provision of methods of and apparatus for generating and radiating seismic waves in which there is precise control of the wave form and synchronization of multiple units.

A further object of the present invention is the provision of non-destructible methods of and apparatus for generating and radiating seismic waves in which a very high proportion of the energy is expended in producing the seismic waves.

A further object of the present invention is the provision of methods of and apparatus for generating and radiating seismic waves in which the force output can be increased readily and easily and which is not limited by the weight of the system, for example, hold-down requirements.

A further object of the present invention is the provision of methods of and apparatus for providing multiple sweeps from the same position, yet which is very lightweight and can be transported by helicopter or mounted on such smaller vehicles than conventional land vibroseis.

A further object of the present invention is the provision of methods of and apparatus for generating and radiating seismic waves which can also be operated as a single pulse source and in which multiple shocks are possible from the same location without relocation thereby having the advantages of dynamite without the disadvantages of dynamite, such as hole damage, inefficiency, and the like.

A further object of the present invention is the provision of methods of and apparatus for generating and radiating seismic waves in the earth in which no hold-down is required and a good coupling to the earth is maintained.

A further object of the present invention is the provision of methods of and apparatus for generating and radiating seismic waves in earth which is not affected by surface non-similarities, and in which weathering effect is reduced and surface noise effect is minimized.

A further object of the present invention is the provision of methods of and apparatus for generating and radiating seismic waves in earth and in earth under marsh and marine waters which is efficient, relatively inexpensive, more easily maintained, highly portable, and which can readily and easily be adjusted to conditions of use.

Other objects, features and advantages of the invention will appear throughout the specification, claims and drawings.

The foregoing objects, ends and advantages are obtained by the apparatus and methods, the preferred embodiments of which are described below. In summary, however, the apparatus has a generator having a tubular expandable and contractable outer wall closed by rigid, high-strength closures and separate input and return lines in fluid communication with the outer wall's interior. A hydraulic coupling or anchoring pressure is applied directly to be interior of the wall through the pressure input line effective to expand the outer wall and directly anchor the outer wall to the wall of the bore hole. Hydraulic pressure impulses are directly applied through the input and return lines at pressures greater than the coupling pressure to the interior of the outer wall to further expand the outer wall and effective to produce and radiate a seismic wave while maintaining the hydraulic coupling pressure sufficient to anchor the outer wall to the wall of the well bore. Preferably, the hydraulic pressure impulses are cycled by a servo controller which opens and closes a servo valve. In marsh or marine use, no coupling or anchoring pressures are used. Also, in some applications, maintaining the generator coupled or anchored to the earth's wall is unnecessary. Several embodiments of the apparatus are disclosed.

In the method of generating seismic waves in a bore hole, the generator is placed in the bore hole, the expandable and contractible outer wall is coupled or anchored to the bore hole by directly applying a hydraulic coupling pressure sufficient to anchor or maintain the transducer to the wall. Pressures of the order of 50 p.s.i. to 1,000 p.s.i. or higher are satisfactory and no other anchoring is necessary. The hydraulic pressure greater than the anchoring pressure is cycled and directly applied to further expand the expandable wall portion, which stresses the earth and produces and radiates seismic waves in the earth. The cycling pressures should be sufficiently above the coupling pressure to create motion in the earth but should be within the elastic limits of the earth. For example, pressures from about 1,000 p.s.i. to about 3,000 p.s.i. or greater are satisfactory; although for most applications 2,000 p.s.i. is satisfactory. In the method of generating seismic waves in earth in which the generator is placed in marsh or marine water above the earth, no coupling pressure is necessary. Also, for civil use, anchoring is unnecessary.

A more detailed description of presently preferred embodiments of the invention is set forth in the description of the presently preferred embodiments of the invention.

BRIEF DESCRIPTION OF THE DRAWINGS

FIG. 1 is an elevational view illustrating apparatus for generating seismic waves according to the invention shown in a well bore in the earth.

FIG. 2 is a sectional elevation of the expandable and contractible portion of the transducer of FIG. 1.

FIG. 3 is an elevational view, partly in section, illustrating another embodiment of an apparatus for generating seismic waves according to the invention.

FIG. 4 is an elevational view, partly in section, of still another modification of the apparatus according to the invention.

FIG. 6 is an elevational view illustrating another embodiment of an apparatus for generating seismic waves according to the invention.

FIG. 7 illustrates a typical marine use of the invention.

DESCRIPTION OF PREFERRED EMBODIMENTS

Figure 5:
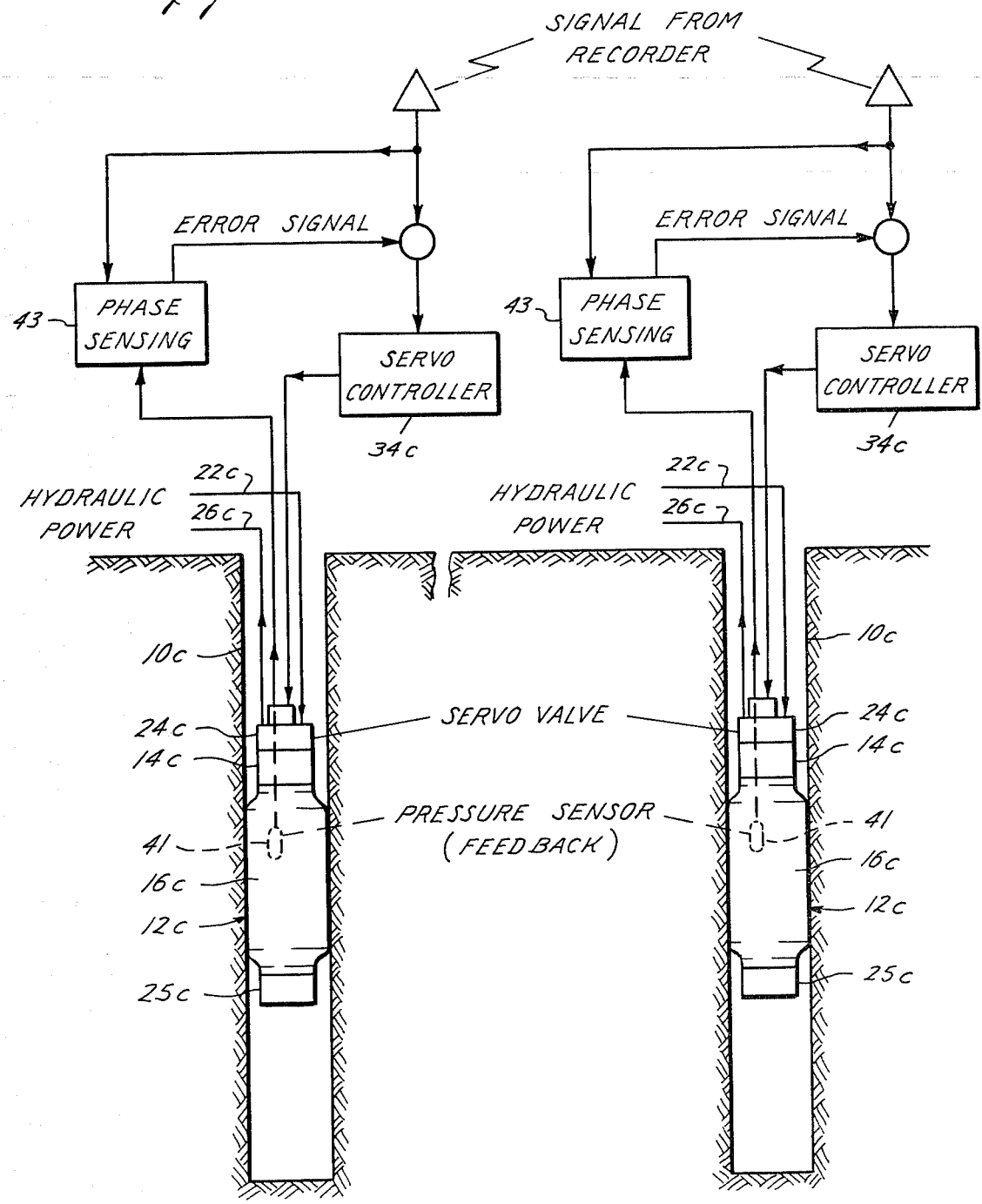
FIG. 5 is an elevational view of apparatus of the invention including means to synchronize the signals of an array of such apparatus.

Referring now to FIG. 1, apparatus according to the invention and useful in the methods of the invention is disclosed and is illustrated in the bore hole 10 although this apparatus may be utilized in water, such as marsh and marine waters above land.

The apparatus includes a generator 12 provided with a generally elongate body 14 having the generally tubular and elongate expandable and contractible outer wall 16.

A pressure source is provided which includes the hydraulic reservoir 18 and pump 20 by which hydraulic pressure is provided through the filter 21 in the pressure input line 22 leading to a servo valve 24 disposed in the upper end of the body 14 of the generator 12 which, in turn, is in communication with the pressure return line 26 to the reservoir 18 and pump 20. Pulsation dampeners 28 and 30 are provided in the pressure input line 22 and the pressure return line 26, respectively, the latter line having the cooler 32 for cooling the hydraulic fluid, if required.

A servo controller 34 is provided, preferably on a deck (not shown) at the surface, which servo controller 34 is connected by the line 36 to the pilot stage 38. The servo valve 24 is a three-way electrohydraulic valve and it is opened and closed by the servo controller which thus provides pressure cycling to within the generator 12 and the expandable and contractible outer wall portion 16.

Preferably, the hydraulic reservoir 18 has a precharged pressure on the hydraulic liquid in it, such as introduced through the pressure line diagrammatically illustrated at 40, or a supercharge pump, not shown, is provided on the suction of the main pump 20.

The hydraulic reservoir 18, precharge pressure 40, pump 20, servo controller 34, three-way electrohydraulic servo valve 38, pulsation dampeners 28 and 30 and cooler 32 are all conventional items, are readily available on the market, and accordingly, no detailed description thereof is deemed necessary or given.

The generator 12 includes the elongate body 14 as previously mentioned, and the expandable and contractible outer wall portion 16 which is better illustrated in FIG. 2 to which reference is now made. The generator, essentially, is a packer used in oil wells, such as in drill stem testing, hydraulic fracturing, acidizing, and other remedial operations and in some completions and production. Such packers are commercially available from Lynes, Inc. and Tam, Inc., both of Houston, Tex.

The outer wall portion 16 actually comprises the wall of the generator 12 and is reinforced by the expandable tubular reinforcing 17, which are overlapping, metal strips which overlap and slide with respect to one another, or flat braided metal wire, or tubular braid, although other materials of sufficient strength can be used. At each end of the expandable and contractible wall 16 are provided the rigid, high-strength upper and lower fittings 19, the upper of which is connected to the upper rigid, high-strength body closure member 14 and the lower of which is connected to the lower rigid, high-strength body closure member 25, which fittings 19 provide high-strength attachment to the high-strength closure members 14 and 25. The fittings 19 and closure members 14 and 25 may be formed of any high-strength, rigid materials which will not substantially deform under conditions of use, such as high-strength steel. Thus, hydraulic pressue introduced into the interior of the expandable and contractible wall 16 causes an expansion thereof only and an application of hydraulic pressure to the interior wall of the well bore 10.

The normal packer assemblies avaiable to the trade are capable of withstanding several thousand pounds per square inch when confined by the well bore, and when deflated, are easily run into or withdrawn from the bore hole 10, their expansion being up to twice their diameters.

In the case of generating seismic waves in a bore hole, such as indicated at 10, a hydraulic coupling pressure sufficient to anchor the wall portion 16 of the generator 12 firmly against the earth wall of the well bore 10 avoids the requirement for any anchor or hold-down assembly for the generator. Pressures of the order of 50 p.s.i. to 1,000 p.s.i. are satisfactory with lower coupling pressures being preferred, for example 100 p.s.i. Hydraulic pressure impulses greater than the coupling pressures are directly cycled to the interior of the generator 12, thereby compressing the earth's wall thereby stressing the earth and generating and radiating seismic waves. These pressures can range up to and above 2,000 p.s.i. The contraction of the outer wall 16 of the packer 12 is caused by the resistance offered by the earth's wall of the bore hole 10 when the pressure is released. Thus, the earth is alternately compressed and released by the wall 16 of the packer 12, hold-down or coupling is not a problem and a separate hold-down is not needed, and the generator can be operated completely within the earth's elastic range. In addition, the outer wall 16 is flexible and completely conforms to the well bore while being rigidly confined at its top and bottom by the rigid closure members 14 and 25. The radial expansion of the expandable and contractible wall portion 16 due to compacting of the earth is automatically compensated for by the system's residual or reference coupling pressure.

As previously mentioned, in geophysical work the coupling pressure should be sufficient so that the generator 12 is coupled and stays coupled or anchored in the ground to prevent noise which would distort the results. Preferably, 100 p.s.i., although lower coupling pressures such as 50 p.s.i., are satisfactory. Also, if desired, higher coupling pressures can be used, say of the order of 1,000 p.s.i. The coupling or anchoring pressure should be sufficiently lower so that the cycling pressure creates motion in the earth within the earth's elastic range. For example, a coupling pressure of 1,000 p.s.i. and a cycling pressure of 2,000 p.s.i. provides satisfactory results. It is desirable, however, to have the coupling pressure as low as possible so that more pressure can be applied when cycling. The anchoring pressure should never exceed the operating or cycling pressure, and preferably there should be a high pressure differential between the anchoring and cycling pressure. Thus, a feature of the present invention is being able to adjust the anchoring and cycling pressures readily and easily and while in operation to fit the particular circumstances of use which, of course, cannot be done in the vibroseis system.

The generators may be constructed of any length or diameter and one or more may be operated in the same bore hole. A system pressure of up to 2,000 p.s.i. is easily obtainable with much less expensive pumping equipment than in surface vibroseis. This is well within the capability of rotary or gear pumps, whereas land vibroseis systems operate at 3,000 p.s.i. which in turn requires more expensive piston pumps and hydraulic components.

Referring again to FIG. 1, the seismic waves radiated by the generator 12 are detected by one or more detectors diagrammatically illustrated at 42 where they are recorded so that they can be interpreted in the usual manner. No description is given of the detector 42 as any detectors and recorders of seismic waves of which there are many available on the market can be utilized.

Referring now to FIG. 3, in which the reference letter "a" is applied to mumerals designating corresponding parts of the apparatus of FIGS. 1 and 2, a modified form of a generator 12a is illustrated which includes the outer expandable and contractible elongate tubular wall portion 16a, lower closure fitting 25a, upper closure fitting 23a which, in this case, is connected to a closed cylinder 25 provided with the piston 27 and piston rod or ram 29 which extends through a stuffing box 31 into the upper end of the flexible, expandable and contractible wall 16a of the generator 12a. In this embodiment the hydraulic pressure input line 22a and return line 26a extends through the four-way servo valve 24a and into the upper and lower ends of the cylinder 25, respectively. Thus, as hydraulic pressure is cycled into the upper end of the cylinder 25 by the servo valve 24a and the line 22a the piston 27 is forced rapidly downwardly thereby forcing the piston or ram 29 downwardly and into substantial portion of the interior part of the generator 12a thereby causing an expansion by displacement of the entrapped hydraulic liquid within the flexible wall 16a. Hydraulic pressure is then cycled to the lower end through the pressure return lines 26a and servo valve 24a thereby causing a raising of the piston 27 and, in turn, of the piston rod or ram 29, therby releasing the pressure. Thus, the servo valve 24a strokes the ram 29 which causes the expandable and contractible wall portion 26a to inflate and deflate.

This particular embodiment can be used in bore holes in the earth or in water above land. This embodiment does furnish more control over the deflated or contracting portion of the pressure cycle and is particularly advantageous in marine operations since the natural restoring forces of the resilient wall of the generator may result in too large a time constant to allow high-frequency operations without control of the deflating portion of the cycle.

Reference is now made to FIG. 4 which illustrates a further modification which assists in deflating the generator 12b by applying a restoring force in addition to the resiliency of the wall. In this Figure the reference letter "b" has been applied to numerals designating corresponding parts of the preceding figures. In this embodiment a mandrel 33 is connected to the upper end 19b of the generator 12b which extends throughout the length of the expandable and contractible body portion 16b and into the lower closure member 25b which includes means, here shown as a compression spring 35 bearing against the lower end 37 of the mandrel, which biases the expandable and contractible body 16b in an extended and hence a contracted position. While a spring 35 is illustrated, a pressurized gas or other restoring forces can be used, not shown.

The mandrel 33 has a series of ports 39 disposed along its length within the expandable and contractible wall 16b so that hydraulic pressures from the input pressure line 22b engage and are directly applied against the inner surface of the expandable and contractible wall 16b thus expanding the wall. When the internal pressure is released, the restoring force provided by the compression spring 35 is in addition to the natural resilience of the expandable and contractible wall 16b which assists in deflating or contracting it. The remaining parts and operation are the same as described in connection with FIG. 1, except for the additional restoring force, and, accordingly, no more detailed description is given or deemed necessary. This embodiment can also be used in bore holes and is especially adapted for use in water because of its controlled contraction thereby permitting high-frequency cycling.

In geophysical prospecting it is sometimes desirable or necessary to provide additional seismic energy output above that available for a single generator. Also, it may be geophysically desirable, and it is standard practice in the industry, to space two or more generators in an array to create a broader wave front of seismic energy. In such a case, however, it is necessary that all generator outputs be synchronized to provide for signal enhancement rather than signal cancellation. Such an arrangement is illustrated in FIG. 5, to which reference is now made, and in which the reference letter "c" has been added to numerals designating parts corresponding to parts of the previous figures.

In this embodiment a pair of generators 12c are illustrated in spaced-apart bore holes 10c in the earth and a pressure sensor 41 is provided within each of the expandable and contractible walls 16c of each of the generators 12c, each of which transmits a signal produced by the actual hydraulic pressure within the expandable and contractible wall 16c to its phase-sensing unit 43 which produces an error signal. This error signal is added to and thus modifies the input signal from the recorder, not shown, and proceeds to drive the servo valves 24c with a signal that attempts to bring about synchronization with the true input signal. While only two generators are shown, additional generators and their controls are the same and operate in like manner in response to radio input or recorder signals. Thus, all inflatable generators are "locked in" or synchronized on the same drive signal. If desired, actual outputs of two generators can be compared by displaying the pressure-sensor outputs on a dual-trace oscilloscope, not shown.

The pressure-sensor 41, phase-sensing unit 43, recorder or radio, not shown, and electronic circuitry are all readily available upon the open market and, accordingly, no detailed description thereof is deemed necessary or given.

The remaining parts of the seismic wave generating apparatus of FIG. 5 are the same as those of FIG. 1, and any of the modified generators can be utilized as illustrated in FIGS. 3 and 4.

If desired, the reservoir, pump and servo valve can be connected to the generator and lowered into the well bore as a downhole unit rather than having them on the surface, as illustrated in FIG. 6 to which reference is now made and to which the reference letter "d" has been added to corresponding parts of the other Figures of the drawings for convenience of reference.

Here the servo valve 24d, pump 20d and reservoir 18d are all connected to the generator 12d and the entire unit is lowered into the well bore 12d by the cable 50d which serves to provide means for lowering and raising the generator 12d into and out of the well bore 10d and also to provide electrical power for the pump 20d and servo valve 24d.

While not shown, there are communicating passages between the reservoir 18d, pump 20d, and servo valve 14d into the generator 12d, as illustrated in FIG. 1, and the operation and results are the same as described in connection with that Figure. Accordingly, no more detailed description of the embodiment of FIG. 6 is given or deemed necessary.

As previously mentioned, while the generator 12 is illustrated in the earth bore hole 10, it may also be used in water, such as in marine surveys. Turning now to FIG. 7, in which the reference letter "e" is applied to numbers designating corresponding parts to those of the previous figures, and which illustrates the use of the generators 12e in water, it is seen that an array of generators 12e are provided in the marine water by the cables 13 from the boat 15. A streamliner 17 is towed by the boat 15 by means of the cable 19, the streamliner 17 having the detectors or seismic phones 42e for receiving the reflected seismic waves as indicated, which are fed by the cable 19 into an instrument room, not shown, of the boat 15 for recording and display in the usual manner. In such use in water, the generators would be the same as in the other embodiments, but the pressure system would be adjusted so that there would be no reference or coupling pressure, since this is unnecessary when using in water.

Any of the foregoing apparatus for generating seismic waves can be used in the method of the invention.

In practicing the method of the invention in bore holes in the earth, the method comprises placing a generator or generators such as indicated at 12 in the drawings, having an expandable and contractible tubular outer wall closed at each end by high-strength, rigid closures in direct contact with the earth wall of the bore holes as illustrated in FIGS. 1 and 5. A hydraulic coupling pressure is directly applied to the expandable and contractible outer wall to expand it into and directly couple and anchor it with the earth wall.

The coupling or anchoring pressure should be sufficient to couple or firmly anchor the generator in the well bore without movement for seismic use in geophysical prospecting and without the necessity for a separate anchoring system. Coupling or anchoring pressures of 100 p.s.i. have been found satisfactory, although lower coupling pressures such as 50 p.s.i. can be used and, if desired, higher coupling pressures on the order of 1,000 p.s.i. can be used. The anchoring or coupling pressure should be sufficiently lower than the cylng pressure to create motion in the earth within the elastic range of the earth. For example, a coupling pressure of 1,000 p.s.i. could be used with a cycling pressure of 2,000 p.s.i. It is desirable, however, to have the coupling pressure as low as possible so that more pressure can be applied when cycling. Thus, the anchoring pressure should never exceed the operating pressure, and preferably there should be a high pressure differential between the anchoring or coupling pressure and the cycling pressures.

Hydraulic cycling pressure or impulses are directly applied to the generator and to the interior of the expandable wall portion which expands upon application of each impulse, and effectively produces and radiates a seismic wave in the earth by stressing the earth wall. The natural resistance on the part of the earth and the resiliency in the outer wall of the generator cause the outer wall to contract sufficiently so that it can be expanded with the next direct hydraulic pressure impulse to generate and radiate a seismic wave in the earth. It is significant that the operating pressures, that is, the coupling and cycling pressures, can be tuned to stay within the elastic strength of the earth, which can be accomplished when the generator is in the well bore. Thus, the method can be used effectively under a wide variety of conditions and uses.

In both the method of generating seismic waves in earth by placing the generator in a bore hole in the earth and in water above the earth, a restoring force can be applied to the contractible wall to assist in contracting it, which is particularly useful when the generator is placed in water. Also, one or more generators and arrays of generators can be utilized and their outputs synchronized to provide signal enhancement rather than signal cancellation. This is accomplished by sensing the actual hydraulic pressure within each of the generators, producing a signal of the actual pressure and comparing this signal with the input signal which controls the pressure cycling. This produces an error signal in proportion to the degree of phase disagreement which modifies the input signal which controls the hydraulic pressure cycling and attempts to bring about synchronization with the true input signal. The other generators operate in like manner in response to the same radio input signal. Thus, all the generators are "locked in" or synchronized on the same drive signal. The method also includes displaying and comparing the pressure sensor signals, such as on a dual-trace oscilloscope.

The present invention, therefore, is well-suited and adapted to attain the objects and ends and has the advantages and features mentioned as well as others inherent therein which are within the spirit of the invention as encompassed within the scope of the accompanying claims.

What is claimed is:

1. Apparatus for generating seismic waves comprising:
   a generator having a closed and generally elongate body including a reinforced tubular expandable and contractible outer wall,
   a mandrel disposed within a portion of the elongate body,
   one end of the mandrel being slideably disposed within one end of the elongate body,
   means engaging the slideable end of the mandrel and the end of the elongate body operable to move the mandrel in a position effective to contract the wall portion upon cessation of each hydraulic pressure impulse to the interior of the expandable and contractible wall portion,
   a hydraulic pressure source, separate pressure input and return lines extending from the body to the hydraulic pressure source and operable to provide hydraulic pressure to the interior of the body effective to expand the outer wall, and means to cycle hydraulic pressure impulses through the input line into the interior of the body and from the body in the return line, each expansion of the outer wall effective to produce and radiate seismic waves.

2. The apparatus of claim 1 where, the mandrel is tubular, the means operable to move the mandrel are biasing means yieldingly biasing the tubular mandrel in an extended position, and including, means in the mandrel communicating with the interior of the body and the outer wall thereby permitting application of the pressure impulses to the interior of the outer wall.

3. The apparatus of claim 2 where, the means to cycle the hydraulic pressure impulses includes, a servo valve in the input line operable to permit hydraulic pressure flow through the input line into the interior of the body and out of the interior of the body through the return line, and a servo controller controlling operation of the servo valve thereby cycling the pressure impulses to the interior of the body effective to expand the outer wall.

4. The apparatus of claim 1, including, a cylinder in one end of the body, the input and output pressure lines being connected to opposite ends of the cylinder, a piston movable in the cylinder in response to application of pressure, a closed fluid chamber provided with hydraulic fluid disposed in the body interiorly of and in fluid communication with the expandable and contractible outer wall, the mandrel being connected to the piston and extending into the chamber whereby application of the pressure impulses in the input line to the cylinder causes movement of the piston and the mandrel in a direction to cause the mandrel to move further into the chamber, thereby causing a displacement of the hydraulic fluid therein and expansion of the expandable outer wall, release of hydraulic pressure in the input line causing movement of the tubular member in a direction outwardly of the chamber in response to hydraulic pressure built up by the displacement of the hydraulic fluid therein thereby contracting the contractible outer wall.

5. The apparatus of claim 4 where, the means to cycle pressure impulses into the cylinder includes, a servo valve in the input line, and a servo controller operable to open and close the servo valve thereby cycling the hydraulic pressure impulses.

6. The apparatus of claim 5 where, the hydraulic pressure source, the input and return lines, and the servo valve and servo control are connected to the generator as a unit.

7. The apparatus of claim 1 including, a plurality of the apparatus for generating seismic waves, and means operable to synchronize the cycling of hydraulic pressure impulses to each of the plurality of the apparatus.

8. The apparatus of claim 1, including, pulsation dampeners in the pressure input and return lines.

* * * * *